Figure 1:
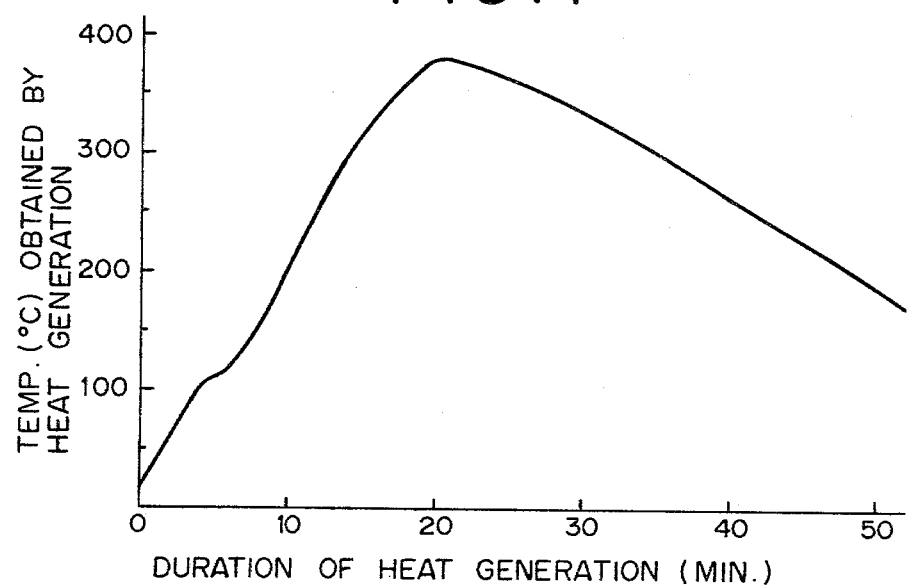

United States Patent [19]

Yamaguchi et al.

[11] 4,255,157
[45] Mar. 10, 1981

[54] THERMOGENIC COMPOSITIONS

[75] Inventors: Denjirou Yamaguchi; Noboru Mogi; Toshio Seta; Kunizo Oishi; Yoshihisa Fuzimori; Atsushi Suzuki, all of Kyobashi, Japan

[73] Assignee: Toyo Ink Manufacturing Co., Ltd., Tokyo, Japan

[21] Appl. No.: 76,700

[22] Filed: Sep. 18, 1979

[30] Foreign Application Priority Data

Sep. 21, 1978 [JP] Japan ................................. 53-116168

[51] Int. Cl.$^3$ .............................. F24J 1/00; F24J 3/00
[52] U.S. Cl. ....................................... 44/3 C; 126/263
[58] Field of Search ................ 44/3 R, 3 A, 3 B, 3 C; 126/263

[56] References Cited

U.S. PATENT DOCUMENTS

| 4,093,424 | 6/1978 | Yoshida et al. | 44/3 C |
| 4,114,591 | 9/1978 | Nakagawa | 126/263 |

*Primary Examiner*—Carl F. Dees
*Attorney, Agent, or Firm*—Jordan and Hamburg

[57] ABSTRACT

A thermogenic composition comprising (1) at least one of alkali metal sulphides, polysulphides and hydrates thereof, (2) at least one of carbonaceous materials, (3) at least one of powdered iron, magnesium, aluminum and powdered alloys of these metals and, if desired, calcium oxide, the thermogenic composition being capable of heat generation when contacted with air or oxygen.

7 Claims, 6 Drawing Figures

THERMOGENIC COMPOSITIONS

This invention relates to a thermogenic composition which will generate a large amount of heat only by contacting with air or oxygen.

There have heretofore been known thermogenic compositions capable of chemically generating heat, such as (1) a composition comprising as the main component an inorganic oxide such as calcium oxide which will generate heat by reacting with, or dissolving in, water supplied from outside, (2) a composition which comprises metal powder such as iron powder or aluminum powder and an inorganic metal salt such as iron sulphate, copper sulphate, iron chloride or sodium chloride and which will generate heat by contacting with water and air (or oxygen) outwardly supplied, and (3) a composition which comprises at least one member selected from the group consisting of alkali metal sulphides, polysulphides, hydrosulphides and hydrates thereof, and carbonaceous material and which will generate heat by contacting with air or oxygen (U.S. Pat. No. 4,093,424).

The said conventional thermogenic compositions (1) and (2) are disadvantageous in that they are capable of producing an insufficient amount of heat, they require externally supplied water for their heat generation when used or they are required to comprise thermogenic material and water separated therefrom and have a means for mixing the two together when used, and they are greatly limited in packaging, manner of use, application and the like.

The said conventional thermogenic composition (3) is advantageous in that it will generate heat only by introducing air or oxygen thereinto. In addition, it is excellent in packaging, manner of use, application and the like as compared with the conventional compositions (1) and (2). However, if the conventional composition (3) contains the hydrate of alkali sulphides and the like, it has more satisfactory thermogenic capacity than the conventional compositions (1) and (2) but it has insufficient thermogenic capacity for uses requiring high temperatures whereby it will give a lower temperature than required when used. If the conventional composition (3) contains the anhydride of alkali sulphides and the like, it will generate a larger amount of heat when used whereby a higher temperature will be obtained; however, methods for the industrial production of such anhydrides are complicated ones thereby raising problems as to the industrial production of thermogenic compositions containing such anhydrides. Furthermore, even these thermogenic compositions have sometimes been unsuitable for uses requiring a larger duration of heat generation at a high temperature.

The thermogenic compositions of this invention are those which eliminate the disadvantages of the aforesaid conventional thermogenic compositions. More particularly, they comprise (A) at least one member selected from the group consisting of sulphides and polysulphides of alkali metals, and hydrates thereof, (B) carbonaceous material, (C) at least one member selected from the group consisting of powdered iron, magnesium, aluminum and alloys thereof and, if desired, (D) calcium oxide. In addition, the thermogenic compositions have the following features:

(1) They do not require externally supplied water for heat generation but they only contact with air or oxygen for generating heat at a high temperature. They may be controlled to give any desired temperatures by adjusting the degree of their contact with air or oxygen, their composition and the like. Further, they may give higher temperatures than the conventional thermogenic compositions.

(2) They will neither evolve harmful gases nor produce dangerous reaction products during their reaction when in use and, therefore, they may be disposed of with high safety after having been used up.

(3) They may continue or interrupt heat generation by continuing or interrupting contact with air.

(4) They neither require water supplied from outside nor evolve steam (which is likely to cause scald) by their heat generation.

(5) They are capable of generating a large amount of heat if they are used even in a small amount.

Because of their features (1)–(5) mentioned above, the thermogenic compositions of this invention may find wide uses.

In a case where the thermogenic compositions of this invention containing the hydrate as the component (A) are contacted with air or oxygen, the heat generated will be consumed in vain particularly above 100° C. to evaporate the water present in the hydrate and a raise in temperature will be retarded at or near 100° C. whereby it takes a time for the temperature to be raised beyond this temperature, this raising problems depending on purposes for which the thermogenic compositions are used. These problems were considered more serious since the component (A) which was easily available for industrial purposes was the hydrate as previously mentioned. According to this invention, however, it has been found that the addition of calcium oxide as the component (D) to the thermogenic compositions is very effective in solving said problems.

This invention will be explained in more detail hereinbelow.

The alkali metal sulphides and polysulphides as well as the hydrates thereof used as the component (A) in the thermogenic compositions of this invention include sulphides and polysulphides of alkali metals such as lithium, sodium, potassium, rubidium and cesium and also include the hydrates of the sulphides and polysulphides. These alkali metal compounds may be used as the component (A) singly or in combination. Among the alkali metals contained in these alkali metal compounds, sodium and potassium are preferred. Typical of the sodium compounds as the component (A) are $Na_2S$, $Na_2.1/2H_2O$, $Na_2S.3H_2O$, $Na_2S.5H_2O$, $Na_2S.9H_2O$, $Na_2S_2.2H_2O$, $Na_2S_2.6H_2O$, $Na_2S_3.8H_2O$, $Na_2S_3.H_2O$, $Na_2S_4.9H_2O$, $Na_2S_4.11H_2O$ and $Na_2S_3.6H_2O$. There are available many mixtures of various such hydrates. The sodium compounds consisting mainly of commercially easily available $Na_2S.3H_2O$ are preferred. These sodium compounds, per se, will not generate heat in air, but they will generate heat in air when mixed with the carbonaceous material as the component (B) which has a catalytic action on the component (A). The catalytically active carbonaceous material (B) includes activated carbon, charcoal, carbon black, graphite or soot, with carbon black being preferred for generating heat at a high temperature.

It is preferable that the components (A) and (B) be not larger than 10 mesh in particle size.

The component (C) used in the thermogenic compositions of this invention includes iron, aluminum, magnesium or alloys thereof each in powder form and may include reduced iron or nitrided iron each in powder form, or powders (of the above metals and iron compounds) the surface of which has been stabilized by oxidation treatment, oil immersion treatment or the like. As the particle size of the component (C) is smaller, the thermogenic composition will generate heat at a higher temperature. Thus, the particle size of the component (C) may be not larger than 10 mesh, preferably 100 mesh.

Calcium oxide which may be used as the component (D) if desired in the thermogenic compositions of this invention, should preferably be one having as small a low water content as possible and may be quick lime for industrial uses. The particle size of such calcium oxide may be not larger than 10 mesh, preferably 20 mesh.

In the three-component ((A), (B) and (C)) thermogenic compositions of this invention, the thermogenic or heat generation mechanism is undoubtedly that the component (A) will generate heat by contacting with oxygen for causing oxidation reaction with aid of the catalytic action of the component (B) and the component (C) already heated will then react with oxygen for further generating heat. However, it is appreciated that no heat will be generated by contacting the components (B) and (C) with oxygen and that, in general, powdered iron and carbonaceous material will require the coexistence therewith of water and a salt such as sodium chloride for heat generation and the heat generation at a temperature higher than the boiling point of water will not continue for a long time in this case. In this invention, however, the addition of water, sodium chloride or the like to the thermogenic composition will be a bar to a case where heat generation at high temperatures is required. Thus, the thermogenic mechanism in this invention is considered to be that the heat generated by reacting the component (A) with oxygen in the presence of the catalytically active component (B) activates the component (C) and the activated component (C) is then reacted with oxygen for heat generation.

When there was analyzed with X-rays the residue obtained by allowing the four-component ((A), (B), (C) and (D)) thermogenic composition containing the hydrate as the component (A) to generate heat to the full extent, with the result that large amounts of sodium sulphate, calcium carbonate and metal oxides of the component (C) origin were detected. From this result the thermogenic mechanism in this case is considered to be that the component (A) is firstly reacted with oxygen in the presence of the component (B) for heat generation, the heat so generated releases the crystallization water from the component (A), the thus released free water reacts with the component (D) to generate heat to further raise the temperature of the thermogenic composition itself thereby oxidizing the compound (B) as the catalyst to carbonic acid gas and then the carbonic acid gas so produced is exothermically reacted with the unreacted portion of the component (D) thereby to produce calcium carbonate. The above is surmised from the fact that calcium carbonate was detected in the reacted mass. The component (C) is activated by being heated to a high temperature by said exothermic reactions and then reacted with oxygen to effect heat generation at higher temperatures. As mentioned above, the thermogenic compositions of this invention are characterized by multi-step exothermic reactions thereby to obtain very high temperatures.

The thermogenic compositions of this invention are capable of generating heat for obtaining desired temperature even by changing the ratio between the components thereof.

The component (A) should be used in the preparation of the thermogenic composition in an amount by weight of preferably 5–50% thereof. The use of more than 50 wt.% of the component (A) will result in the production of a thermogenic composition which will disadvantageously take a comparatively long time to give a desired high temperature when contacted with oxygen, while the use of less than 5 wt.% of the component (A) will result in the production of a thermogenic composition which will generate insufficient heat thereby not giving a desired high temperature when contacted with oxygen. This is true particularly with a case where the component (A) is the hydrate.

The component (B) should be used in the preparation of the thermogenic composition in an amount by weight of preferably 5–50% thereof. The use of more than 50 wt.% of the component (B) will result in the production of a thermogenic composition which will give a comparatively low maximum temperature, while the use of less than 5 wt.% will result in the production of a thermogenic composition which will disadvantageously take a comparatively much time (turn-on time) to give a desired high temperature when contacted with oxygen.

The component (C) may be used in an amount by weight of preferably 15–60% of the resulting four-component thermogenic composition if desired in the preparation thereof. The use of more than 60 wt.% will result in the production of a thermogenic composition which will disadvantageously take a comparatively long time to give a desired high temperature, while the use of less than 15 wt.% will result in the production of a thermogenic composition which will disadvantageously not give desired high temperatures when contacted with oxygen.

The component (D) should be used in the preparation of the thermogenic composition in an amount by weight of preferably 10–70% thereof. The use of more than 70 wt.% will result in the production of a thermogenic composition which will not generate a sufficient amount of heat thereby not giving a high temperature when contacted with oxygen although the reason for this is not clarified yet, while the use of less than 10 wt.% will result in the production of a thermogenic composition which will disadvantageously take a comparatively much time (turn-on time) to give a desired high temperature when contacted with oxygen.

In a case where the three-component thermogenic composition contains the hydrate as the component (A), if the thermogenic composition is incorporated with the component (D) then it will generate more heat and give higher temperatures when contacted with oxygen.

The thermogenic compositions of this invention are capable of giving a maximum temperature of about 1000° C.

The oxygen sources used for the purpose of this invention include air, artificially made oxygen of various purity, and chemically oxygen-producible materials which may be incorporated in the thermogenic composition at the time of preparation thereof. Among these oxygen sources, air is the most convenient and inexpensive.

The thermogenic compositions of this invention are prepared by mixing together the components (A), (B), (C) and, if desired, (D) in an atmosphere of an inert gas such as nitrogen or argon. The thermogenic composition so prepared is enclosed in a container which is permeable to oxygen but does not allow the thermogenic composition to leak therethrough (the oxygen-permeable container being hereinafter sometimes referred to as "container (I)"), and the composition-enclosed container is enclosed in an oxygen-impermeable container such as a bag or molded container (the oxygen-impermeable container being hereinafter sometimes referred to as "container (II)"). They are also prepared by mixing the component (A) with a blend of the components (B), (C) and, if desired, (D) (the blending thereof being not necessarily required to be effected in an inert gas atmosphere) in an inert gas atmosphere. The resulting mixture which is the thermogenic composition of this invention, is enclosed in a container (I). The thermogenic composition-enclosed container (I) is then enclosed in a container (II). In a similar manner, a blend of the components (B) and (D) may also be mixed with a blend of the components (A) and (C). In addition, there may be several other combinations of the components for mixing together to prepare the thermogenic composition. If the container (I) is partly oxygen-permeable (the remaining portion being oxygen-impermeable), the oxygen-permeable portion may be sealed with an oxygen-impermeable material without the use of a container (II). The packaging of the thermogenic composition of this invention is not limited to the aforesaid ones. For example, the components (A) and (D) may be packaged together, while the components (B) and (C) may be packaged together separately from (A) and (D). The thermogenic composition in enclosed or packaged state may be contacted with air (or oxygen) by removing the oxygen-impermeable container (II) or the oxygen-impermeable seal when the composition is used for heat generation.

The materials for the oxygen-permeable container (I) include paper, woven or non-woven cloths made of organic fibers or inorganic fibers such as glass or mineral fibers, and perforated plastics films. These materials may be used singly or in combination.

The materials for the oxygen-impermeable container (II) or seals include plastics films, metals and other inorganic materials. According to this invention, high-temperature heat generation may be effected, and it is preferable in this case to use heat resistant containers, such as metallic containers, for enclosing the thermogenic composition therein. The materials for the metallic containers include aluminum and iron sheets having a thickness of about 0.1-0.5 mm for example. The use of unduly thin metallic sheets in the manufacture of containers will result in the resulting container being broken or perforated after the container has been charged with the thermogenic composition, this being dangerous. On the other hand, the use of unduly thick metallic sheets will result in decreasing heat efficiency thereby making it impossible to use the generated heat effectively.

Both the temperature and duration of heat generation to be obtained by contact of the thermogenic composition with air or oxygen may also be adjusted by the kind and manner of packaging since these vary the area of contact with the air or oxygen. The shape of containers as well as the contact area and its shape may be optionally selected depending on the purpose for which the thermogenic composition is used.

The thermogenic compositions of this invention may generate heat only by contact with oxygen, usually air, as previously mentioned. Methods for the contact of the composition with air include a method comprising perforating the oxygen-impermeable container (II) with something like a needle, a method comprising removing an oxygen-impermeable cover film from the perforated (at least one hole) portion of the oxygen-impermeable container, the cover film having covered the perforated portion, a method comprising the use of a so-called "easy to open" mechanism such as a pull-tab and a method comprising the use of a threaded opening mechanism (screw-cap, etc.).

The thermogenic compositions of this invention are suitable for use in cases where high temperatures are required. They may be used as a heat source, for example, for thermally diffusing (smoking and fumigating) pesticides, fungicides, repellents and incense, for heating canned foods and thawing frozen foods. They may further be used for warming human bodies, for substituting portable fuel, for heating plastics for welding, and for moxacautery, warmed wet dressing and the like as a heat source.

FIGS. 1–6 are each a graph showing the relationship between the temperature obtained by heat generation and the duration of heat generation.

This invention will be better understood by the following Examples and Comparative Examples wherein all parts are by weight unless otherwise specified.

EXAMPLE 1

Eight (8) parts of powdered crystalline sodium sulphide trihydrate which passed through a 20-mesh screen, 8 parts of carbon black (produced under the trademark of Carbon No. 900 by Mitsubishi Kasei Co., Ltd.) and 35 parts of powdered iron (produced under the trademark of Spongy iron No. 300 by Nippon Teppun Co., Ltd.) which passed through a 200-mesh screen, were thoroughly mixed together in a nitrogen gas atmosphere to prepare a thermogenic composition. In the nitrogen gas atmosphere, the thus prepared thermogenic composition (34 g) was introduced into a dish-like iron-made vessel, 10 cm dia.×1.7 cm high×0.4 mm thick, and then covered with an asbestos-like air-permeable filter to prevent the composition from leaking outside thereof. Air was to contact with the thermogenic composition through the said filter. When the composition generated heat by contact with the air, the temperature to be obtained was measured at the central point of the outer side of the bottom of the vessel. The result is as shown in FIG. 1 wherein the axis of abscissa of the graph indicates the heat generation time (min.) and the axis of ordinate thereof indicates the temperature (° C.) obtained by the heat generation. FIG. 1 shows that the maximum temperature was 353° C. and the time of heat generation at 250° C. or higher was 29.6 minutes.

EXAMPLES 2–11

The procedure of Example 1 was followed except that the sodium sulphide trihydrate, carbon black and powdered iron were substituted by sodium sulphides having different quantities of crystallization water, carbon black and powdered iron respectively in the various amounts shown in Table 1, to find the progress or development of heat generation with the results being indicated in Table 1.

Comparative Examples 1 and 2

Figure 3:
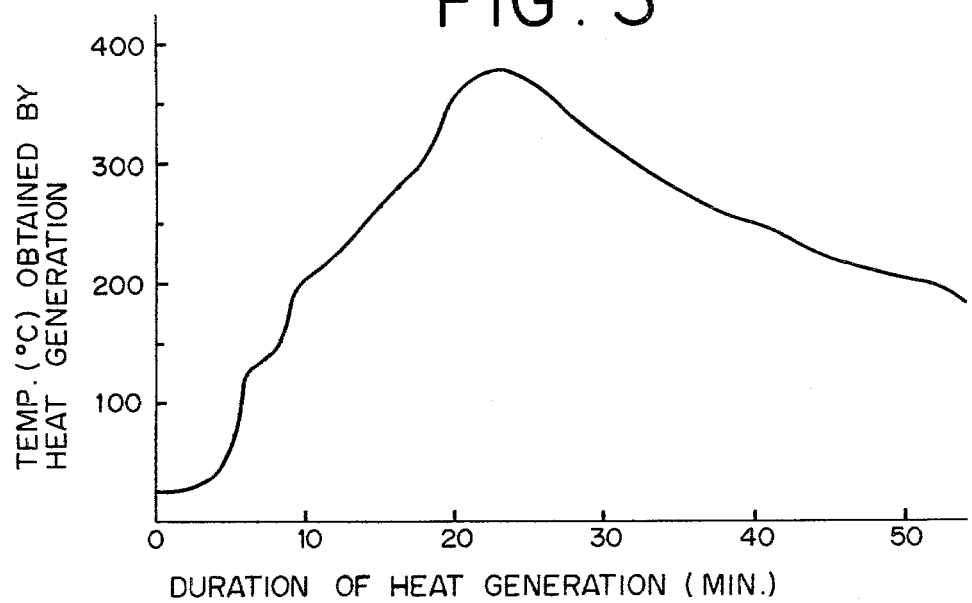

For comparison, the procedure of Example 1 was followed except that powdered iron was not used and that 15 parts of sodium sulphide trihydrate and 10 parts of carbon black were used in Comparative Example 1, to find the progress or development of heat generation with the results being also shown in Table 1.

genic composition. 51 g of the thermogenic composition so obtained was introduced into the same vessel as used in Example 12 to measure the development of heat generation thereof. The result is as shown in FIG. 3.

EXAMPLES 14–17

The procedure of Example 12 was followed except that the components (A), (B) and (C) were used as shown in Table 2 to find the maximum temperature in each Example. The results are as shown in Table 2.

TABLE 1

| | Sodium sulphide | (Parts) | Carbon black (Parts) | Powdered iron (Parts) | Turn-on time (Time to reach temperature described) 200° C. (min.) | Turn-on time 250° C. (min.) | Maximum temperature (°C.) | Duration of heat generation at 250° C. or higher (min.) | Duration of heat generation at 300° C. or higher (min.) |
|---|---|---|---|---|---|---|---|---|---|
| Example 2 | $Na_2S \cdot 3H_2O$ | 6 | 6 | 35 | 9.0 | 11.5 | 326 | 23.2 | 16.9 |
| Example 3 | " | 6 | 10 | 35 | 9.6 | 18.8 | 279 | 14.8 | — |
| Example 4 | " | 7 | 7 | 37 | 10.0 | 12.5 | 342 | 26.3 | 14.4 |
| Example 5 | " | 8 | 8 | 15 | 8.7 | 10.2 | 338 | 16.7 | 11.4 |
| Example 6 | " | 8 | 8 | 25 | 10.9 | 12.8 | 335 | 18.4 | 12.2 |
| Example 7 | " | 10 | 10 | 31 | 12.9 | 15.4 | 320 | 24.2 | 13.0 |
| Example 8 | " | 13 | 13 | 25 | 15.6 | 18.6 | 315 | 25.4 | 11.6 |
| Example 9 | $Na_2S \cdot \tfrac{1}{2}H_2O$ | 8 | 8 | 35 | 8.1 | 11.2 | 358 | 31.9 | 21.8 |
| Example 10 | $Na_2S \cdot 5H_2O$ | 8 | 8 | 35 | 11.5 | 13.2 | 315 | 20.5 | 14.7 |
| Example 11 | $Na_2S$ | 8 | 8 | 35 | 7.5 | 10.5 | 360 | 32.4 | 22.5 |
| Comparative Example 1 | $Na_2S \cdot 3H_2O$ | 15 | 10 | — | 13.2 | 16.0 | 282 | 11.6 | — |
| Comparative Example 2 | " | 8 | 8 | — | 12.9 | 15.5 | 295 | 9.6 | — |

EXAMPLE 12

Figure 2:
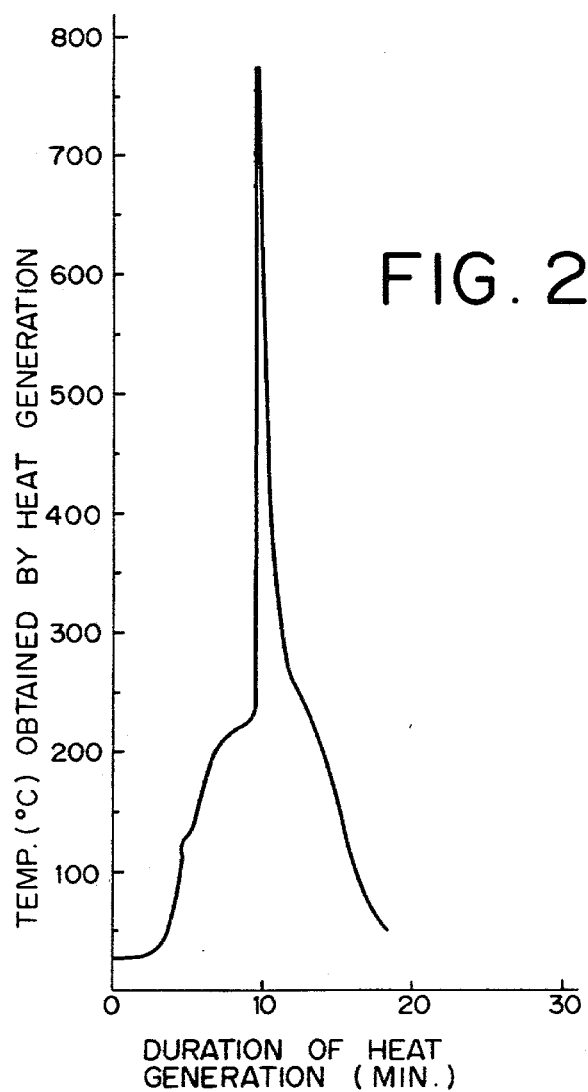

Three (3) parts of the same crystalline sodium sulphide trihydrate as used in Example 1, 2 parts of carbon black (produced under the trademark of Carbon No. 2300 by Mitsubishi Kasei Co., Ltd.) and 3 parts of powdered magnesium which passed through a 60-mesh screen, were thoroughly mixed together in a nitrogen gas atmosphere to obtain a thermogenic composition. In the same manner as in Example 1, the thus obtained thermogenic composition (8 g) was placed in a dish-like iron-made vessel, 5 cm dia.×2.5 cm high×0.2 mm thick, and then measured for progress or development of heat generation. The result is shown in FIG. 2.

EXAMPLE 13

Eighteen (18) parts of the same crystalline sodium sulphide trihydrate as used in Example 1, 12 parts of the same carbon black as used in Example 12, 6 parts of powdered magnesium and 15 parts of powdered reduced iron (produced under the trademark of OC-6 by Nippon Teppun Co., Ltd.), were thoroughly mixed together in a nitrogen gas stream to obtain a thermogenic composition.

TABLE 2

| Example | Component (A) | Component (B) | Component (C) | Maximum temperature (°C.) |
|---|---|---|---|---|
| 14 | $Na_2S \cdot 3H_2O$ 3 Parts | (Carbon black No. 2300) 2 Parts | Aluminum/Calcium alloy powder (passed through a 60-mesh screen; Ca content, 15%) 3 Parts | 750 |
| 15 | Sodium polysulphide 3 Parts | (Carbon black No. 2300) 2 Parts | Powdered magnesium (the same as in Example 12) 3 Parts | 600 |
| 16 | $Na_2S$ 3 Parts | (Carbon black No. 2300) 2 Parts | Powdered magnesium (the same as in Example 12) 3 Parts | 850 |
| 17 | $Na_2S \cdot 3H_2O$ 1 Part | (Carbon black No. 2300) 1 Part | Powdered aluminum (passed through a 60-mesh screen) 1 Part | 1000 or higher |

Note:
Sodium polysulphide used was one produced as a reagent by Yoneyama Pharmaceutical Industry Co., Ltd.

EXAMPLE 18

Figure 4:
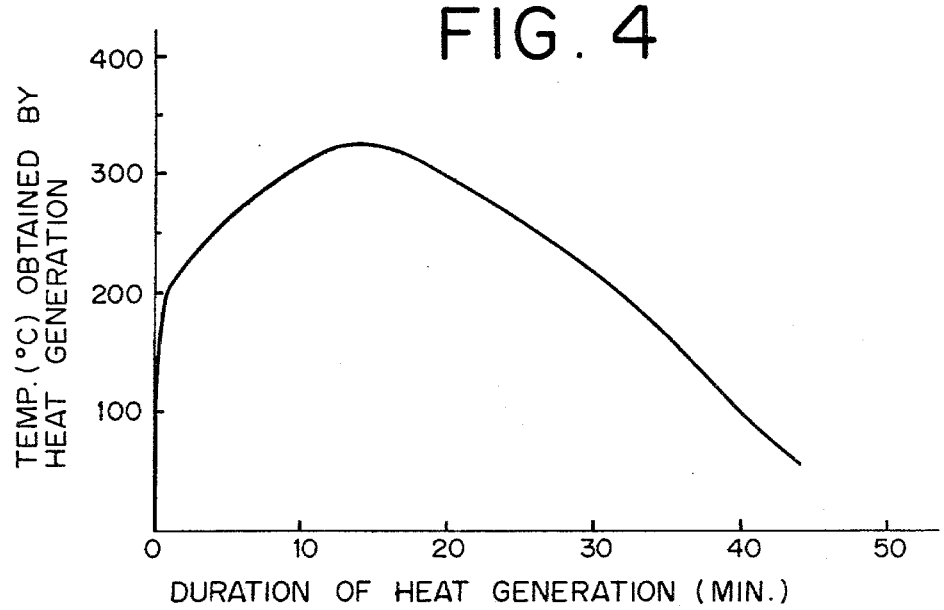
Figure 5:
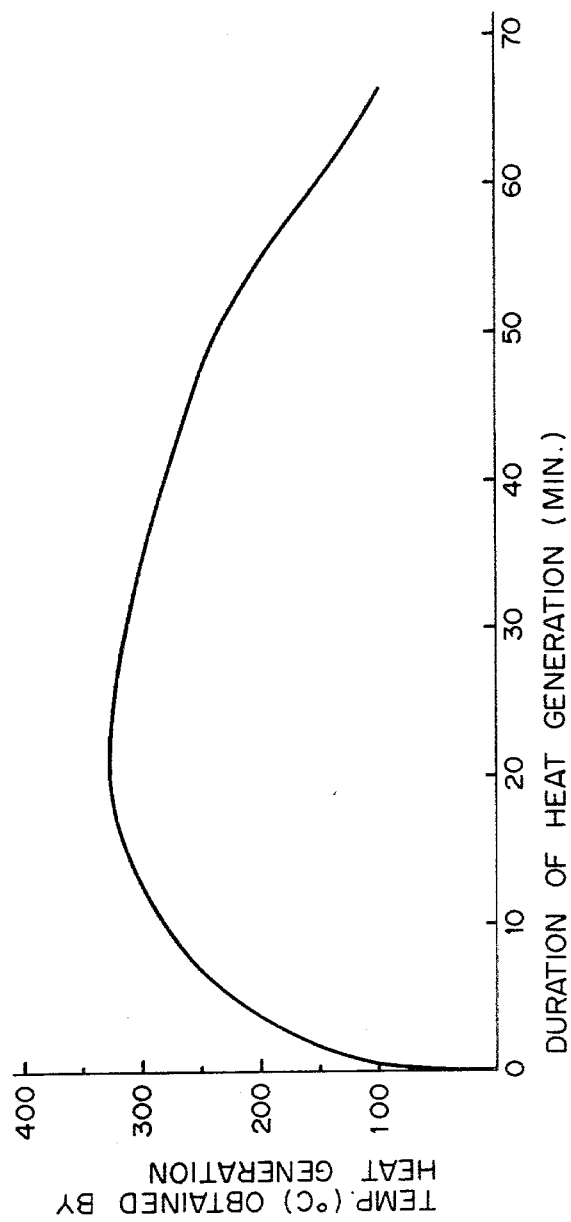

Five (5) parts of crystalline sodium sulphide which contained about 40 wt.% of water as the crystallization water (or hydrate water) and passed through a 20-mesh screen, 5 parts of carbon black (produced under the trademark of SB No. 4 by Degussa Co., Ltd.), 9 parts of calcium oxide which passed through a 20-mesh screen, and 15 parts of the same powdered iron as used in Example 1, were thoroughly mixed together in a nitrogen gas atmosphere to obtain a thermogenic composition which was then measured for its development of heat generation in the same manner as in Example 1. The result is as indicated in FIG. 4.

EXAMPLE 19

Eight (8) parts of the same sodium sulphide hydrate as used in Example 18, 14 parts of calcium oxide, 8 parts of the same carbon black as used in Example 1 and 35 parts of powdered reduced iron (produced under the trademark of KP-400 by Kantoh Denka Kogyo Co., Ltd.) which passed through a 400-mesh screen, were thoroughly mixed together in a nitrogen gas atmosphere to obtain a thermogenic composition. The thus obtained thermogenic composition (55 g) was measured for development of heat generation in the same manner as in Example 1 with the result being shown in FIG. 5.

EXAMPLE 20

Five (5) parts of the same sodium sulphide hydrate as used in Example 18, 12 parts of calcium oxide, 20 parts of powdered iron and 5 parts of powdered activated carbon having a particle size of not larger than 1 mm, were mixed together in a nitrogen gas atmosphere to obtain a thermogenic composition. The thus obtained thermogenic composition (42 g) was measured for development of heat generation with the result that the maximum temperature attained was 220° C. and the duration of heat generation at 200° C. or higher was 5 minutes.

EXAMPLE 21

Figure 6:
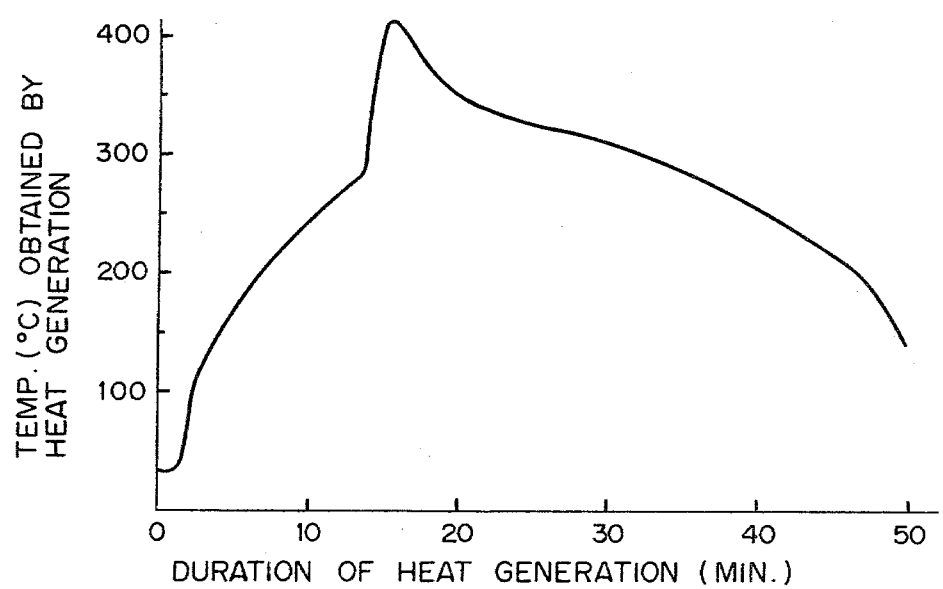

Eight (8) parts of the same crystalline sodium sulphide as used in Example 1, 8 parts of carbon black, 35 parts of powdered reduced iron (produced under the trademark of OC-6 by Nippon Teppun Co., Ltd.) which passed through a 200-mesh screen, 14 parts of calcium oxide which passed through a 20-mesh screen, and 3 parts of powdered magnesium which passed through a 60-mesh screen, were mixed together in a nitrogen gas atmosphere to obtain a thermogenic composition. The thus obtained thermogenic composition (68 g) was measured for development of heat generation in the same manner as Example 1 with the result being as shown in FIG. 6.

Comparative Example 3

Powdered calcium oxide (20 g) which passed through a 20-mesh screen was introduced into the same vessel as used in Example 1 and then incorporated with 7 g of water thereby obtaining a maximum temperature of only 100° C.

Comparative Example 4

Fifteen (15) parts of the same powdered iron as used in Example 1, 2 parts of the same activated carbon as used in Example 20, and 1 part of sodium chloride were thoroughly mixed together to obtain a comparative thermogenic composition. The thus obtained thermogenic composition (36 g) was introduced into the same vessel as used in Example 1 and then incorporated with 10 g of water thereby obtaining a maximum temperature of 70° C.

Reference Example 1

A sheet prepared by impregnating a 9 cm dia. paper with 1.0 g of permethrin which was cockroachicide, was applied to the outside of the bottom of a dish-like iron-made container, 10 cm dia.×1.7 cm high×0.4 mm thick, with the use of a silicone type adhesive. In a nitrogen gas atmosphere, the container so treated was charged through its opening with 31 g of a thermogenic composition comprising 5 parts of the same crystalline sodium sulphide as used in Example 1, 5 parts of carbon black, 12 parts of the same calcium oxide as used in Example 21 and 9 parts of reduced iron powder. The opening of the thus charged container was covered with a satisfactory air-permeable asbestos filter and further covered with a metallic lid having an "easy to open" mechanism. The thermogenic composition in the container was contacted with air for heat generation by removing the metallic lid from the container, with the result that at least 95% of the permethrin was thermally diffused in about 20 minutes.

What is claimed is:

1. A thermogenic composition capable of heat generation by contact with air or oxygen, which comprises:
   (A) at least one component selected from the group consisting of alkali metal sulphides, polysulphides and hydrates thereof,
   (B) at least one component selected from the group consisting of carbonaceous materials and
   (C) at least one component selected from the group consisting of powdered iron, magnesium, aluminum and alloys of these metals.

2. A thermogenic composition according to claim 1, which further comprises calcium oxide (D).

3. A thermogenic composition according to claim 1 or 2, wherein the alkali metal is lithium, sodium, potassium, rubidium or cesium.

4. A thermogenic composition according to claim 1 or 2, wherein the carbonaceous material is activated carbon, charcoal, carbon black, graphite or soot.

5. A thermogenic composition according to claim 3, wherein the carbonaceous material is activated carbon, charcoal, carbon black, graphite or soot.

6. A thermogenic composition according to claim 1 or 2, wherein the components (A), (B) and (C) are present respectively in amounts by weight of 5–50%, 5–50% and 15–60% of the composition, the amounts totalling 100%.

7. A thermogenic composition according to claim 2, wherein the components (A), (B), (C) and (D) are present respectively in amounts by weight of 5–50%, 5–50%, 15–60% and 10–70%, the amounts totalling 100%.

* * * * *